2,759,961
AMINO-ARYL ESTERS OF ACID PHOSPHORUS COMPOUNDS

Howard M. Fitch, New York, N. Y.

No Drawing. Application July 3, 1952,
Serial No. 297,169

18 Claims. (Cl. 260—461)

This invention relates to a new group of compounds which are effective inhibitors of cholinesterase activity and to methods for the production of such compounds.

The compounds of the invention comprise aryl esters of acid phosphorus compounds wherein the aryl ring is substituted by a group including an aliphatically disubstituted amino group, such as dialkylamino, piperidino, pyrrolidino and morpholino groups, and the acid addition salts and quaternary salts of such esters.

Typical of the compounds of the invention are derivatives of phosphoric, phosphonic, phosphinic and phosphorous acids, and their thio analogs and corresponding polyphosphoric acids, wherein one or more of the hydroxyls of the acid are substituted by a dialkylaminoaryloxy or a dialkylaminoalkylaryloxy group. A part of the hydroxyls may also be substituted by halogen, amino, substituted amino, alkyl, aryl, alkoxy or aryloxy groups. The compounds may be prepared or used in the form of their salts with inorganic and organic acids or their quarternary salts, for example, with alkyl halides and sulfates.

In general, the compounds of the invention inhibit cholinesterase and are useful as vasodilators and as stimulants of smooth or striated muscle. The vasodilator action is particularly evident in the compounds of the invention having sulfur attached to phosphorus in the molecule.

The following compounds are illustrative of some of the types of compounds of the invention:

I. Esters of phosphorous acids:
    Tri-(m-dimethylaminophenyl) phosphite
    Tri-(p-dimethylaminophenyl) phosphite II. Esters of phosphonous acids:
    Di-(m-dimethylaminophenyl) ester of benzene phosphonous acid III. Esters of phosphoric acids:
    Tri-(o-dimethylaminophenyl) phosphate
    Tri-(m-dimethylaminophenyl) phosphate
    Tri-(m-diethylaminophenyl) phosphate
    Tri-(p-dimethylaminophenyl) phosphate
    Tri - (2 - methyl - 4 - dimethylamino - 5 - isopropylphenyl) phosphate
    Tri-(o-dimethylaminomethylphenyl) phosphate
    Tri-(p-dimethylaminomethylphenyl) phosphate
    Tri-[p-(3-dimethylaminobutyl)phenyl] phosphate
    Tri-(1-dimethylaminomethyl-2-naphthyl) phosphate
    Tri-(1-piperidinomethyl-2-naphthyl) phosphate
    Tri-(2-piperidinomethyl-1-naphthyl) phosphate
    Di-(m-dimethylaminophenyl) p-nitrophenyl phosphate
    m-Dimethylaminophenyl diethyl phosphate
    Di-(m-dimethylaminophenyl) phosphate
    Di-(p-dimethylaminomethylphenyl) phosphate
    Di-(m-dimethylaminophenyl) phosphoryl fluoride IV. Esters of phosphonic acids:
    Di-(m-dimethylaminophenyl) ester of heptanephosphonic acid
    Di-(m-dimethylaminophenyl) ester of cyclohexanephosphonic acid
    Di-(o-dimethylaminophenyl) ester of benzenephosphonic acid
    Di-(m-dimethylaminophenyl) ester of benzenephosphonic acid
    Di-(m-diethylaminophenyl) ester of benzenephosphonic acid
    Di-(p-dimethylaminophenyl) ester of benzenephosphonic acid
    Di-(o-dimethylaminomethylphenyl) ester of benzenephosphonic acid
    Di-(m-dimethylaminophenyl) ester of aminophosphonic acid
    Di-(m-dimethylaminophenyl) ester of dimethylaminophosphonic acid
    Di-(m-dimethylaminophenyl) ester of 3-dimethylaminopropylaminophosphonic acid
    Di-(m-diethylaminophenyl) ester of dimethylaminophosphonic acid
    m-Dimethylaminophenyl ester of chlorodimethylaminophosphonic acid V. Esters of phosphinic acids:
    m-Diethylaminophenyl ester of (P)-benzene-(P)-dimethylaminophosphinic acid
    m-Dimethylaminophenyl ester of di-(dimethylamino) phosphinic acid VI. Esters of thiophosphoric acids:
    Tri-(m-dimethylaminophenyl) thiophosphate
    Tri-(m-diethylaminophenyl) thiophosphate
    Tri-(p-dimethylaminophenyl) thiophosphate
    Tri - (4 - piperidinomethyl - 2,5 - dimethylphenyl) thiophosphate
    Tri - (4 - morpholinomethyl - 2,5 - dimethylphenyl) thiophosphate
    Tri - (4 - pyrrolidinomethyl - 2,5 - dimethylphenyl) thiophosphate
    Di-(o-dimethylaminophenyl) isopropylthiophosphate
    Di-(p-dimethylaminophenyl) isopropylthiophosphate
    Di-(m-dimethylaminophenyl) β-dimethylaminoethyl thiophosphate
    Di-(m-dimethylaminophenyl) p-nitrophenyl thiophosphate
    Di-(m-dimethylaminophenyl) thiophosphate
    m-Dimethylaminophenyl diethyl thiophosphate
    Di-(m-dimethylaminophenyl) thiophosphoryl chloride
    Di-(p-dimethyaminophenyl) thiophosphoryl bromide
    Di-(p-dimethylaminophenyl) thiophosphoryl chloride
    Di-(p-dimethylaminophenyl) thiophosphoryl fluoride VII. Esters of thiophosphonic acids
    Di-(m-dimethylaminophenyl) ester of benzenethiophosphonic acid
    Di-(m-diethylaminophenyl) ester of benzenethiophosphonic acid
    Di-(o-dimethylaminomethylphenyl) ester of benzenethiophosphonic acid
    Di-(p-dimethylaminophenyl) ester of aminothiophosphonic acid
    Di-(p-dimethylaminophenyl) ester of methylaminothiophosphonic acid
    Di-(m-dimethylaminophenyl) ester of dimethylaminothiophosphonic acid
    Di-(p-dimethylaminophenyl) ester of dimethylaminothiophosphonic acid
    Di-(m-dimethylaminophenyl) ester of di-n-propylaminothiophosphonic acid
    Di-(m-dimethylaminophenyl) ester of n-butylaminothiophosphonic acid Di-(m-dimethylaminophenyl) ester of di-n-butylaminothiophosphonic acid
Di-(d-dimethylaminophenyl) ester of di-n-butylaminothiophosphonic acid
Di-(m-dimethylaminophenyl) ester of di-iso-butylaminothiophosphonic acid
Di-(m-dimethylaminophenyl) ester of di-n-heptylaminothiophosphonic acid
Di-(m-dimethyaminophenyl) ester of 3-dimethylaminopropylaminothiophosphonic acid
Di-(m-dimethylaminophenyl) ester of phenylaminothiophosphonic acid
Di-(p-dimethylaminophenyl) ester of phenylaminothiophosphonic acid
Di-(m-dimethylaminophenyl) ester of N-methylphenylaminothiophosphonic acid
Di-(m-dimethylaminophenyl) ester of N-n-butylphenylaminothiophosphonic acid
Di-(m-dimethylaminophenyl) ester of p-dimethylaminophenylaminothiophosphonic acid
Di-(m-dimethylaminophenyl) ester of benzylaminothiophosphonic acid
Di-(m-dimethylaminophenyl) ester of α-methylbenzylaminothiohosphonic acid
Di-(m-dimethylaminophenyl) ester of N-methylbenzylaminothiophosphonic acid
Di-(m-dimethylaminophenyl) ester of N-n-butylbenzylaminothiophosphonic acid
Di-(m-dimethylaminophenyl) ester of N-3-dimethylaminopropyl - p - dimethylaminobenzylaminothiophosphonic acid
Di-(m-dimethylaminophenyl) ester of dibenzylaminothiophosphonic acid
Di-(m-dimethylaminophenyl) ester of cyclohexylaminothiophosphonic acid
Di-(m-dimethylaminophenyl) ester of morpholinothiophosphonic acid
Di-(m-dimethylaminophenyl) ester of 2-pyridylaminothiophosphonic acid
Di-(m-dimethylaminophenyl) ester of hydrazinothiophosphonic acid
Di-(m-dimethylaminophenyl) ester of phenylhydrazinothiophosphonic acid
Tetra-(m-dimethylaminophenyl) ester of hydrazinobisthiophosphonic acid VIII. Esters of thiophosphinic acids
m-Dimethylaminophenyl ester of di-(n-butylamino) thiophosphinic acid The phosphorus esters of the invention may be prepared by reacting a dialkylamino substituted phenol or naphthol with a phosphorus halide (including oxyhalides and thiohalides). A phenolic hydrogen from the phenol or naphthol combines with a halogen from the phosphorus halide, so that an ester linkage is formed and hydrogen halide is evolved. The hydrogen halide reacts with the dialkylamino group of the starting material or product to form a hydrogen halide salt. Better yields and a more complete utilization of the dialkylamino substituted phenol or naphthol are obtained by using an acid-acceptor to react with the hydrogen halide. Tertiary amines are suitable acid-acceptors; and alkyl tertiary amines, such as triethylamine, and heterocyclic tertiary amines, such as pyridine, are preferred.

The phosphorus esters may also be prepared by reacting the sodium or other alkali metal salt of a dialkylamino substituted phenol or naphthol with a phosphorus halide. In this case sodium halide, rather than hydrogen halide, is formed, and the alkali metal acts as acid-acceptor.

In either case the reactants are conveniently dissolved or suspended in a relatively inert solvent, preferably benzene or toluene, or an excess of the acid-acceptor may be used as the solvent. In some reactions, an alcohol or even water may be used as the solvent, depending on the activity of the phosphorus halide.

It is usually preferable to start with a phosphorus trihalide, replacing one, two, or three of the halogen atoms, depending on the final product desired, with a dialkylamino substituted phenolic ester linkage. Any halogen atom remaining may be reacted further, for example, with ammonia or a primary or secondary amine, to obtain esters with amino or other groups attached to the phosphorus atom, or with alkyl or aryl magnesium halide to attach alkyl or aryl groups to the phosphorus atom.

It is sometimes desirable, however, depending on the availability of the intermediates and the ease of the reaction to start with a substituted phosphorus halide in which one or two groups, such as alkyl, aryl, alkoxy, aryloxy, amino or substituted amino groups are attached directly to phosphorus, and to replace the halogen with dialkylamino-substituted phenolic ester linkages.

In general, the dialkylamino substituted aryl phosphorus esters of the invention are colorless or pale yellow oils or solids, readily soluble in benzene, acetone, or ether and relatively insoluble in water or petroleum ether. The presence of a water-solubilizing group, however, such as a hydroxyl group attached to phosphorus, may alter or reverse the solubility pattern.

The esters show the typical behavior of tertiary amines, forming water-soluble salts with mineral acids, such as hydrochloric, hydrobromic or sulfuric acid, and with organic acids, such as oxalic acid, and forming water-soluble quaternary salts with methyl iodide, methyl bromide or dimethyl sulfate. The salts with mineral and organic acids are usually oils or non-crystalline solids, as are the methobromides and methomethyl sulfates. The methiodides can be obtained crystalline in many cases. They are usually hygroscopic and tend to crystallize with one or more molecules of water of crystallization. One molecule of water is usually very firmly attached; any additional water can usually be removed by drying at reduced pressure over phosphorus pentoxide. The methiodides decompose when heated to their melting point, and the apparent melting points depend on the rate of heating. For all melting points reported, the rate of heating was 5° C. per minute or slower.

The following specific examples and corresponding structural formulas are illustrative of the compounds and methods of the invention:

I.
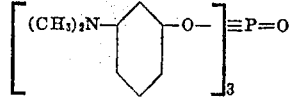

II.
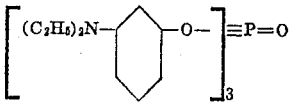

III.
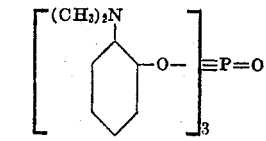

IV.

V.
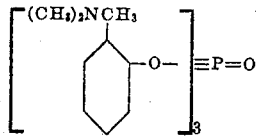

VI.
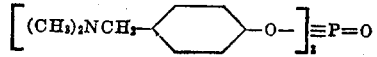

VI(a). 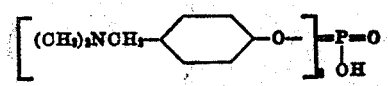
VII. 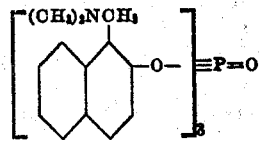
VIII. 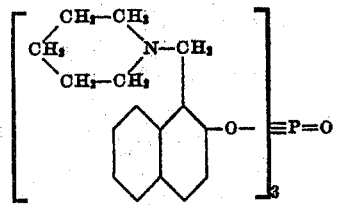
IX. 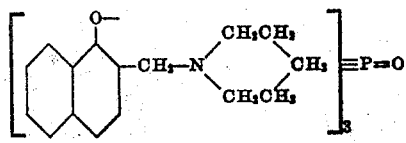
X. 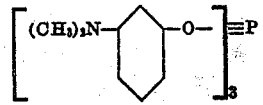
XI. 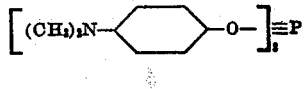
XII. 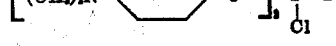
XIII. 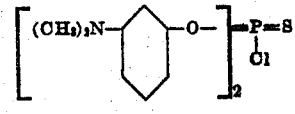
XIV. 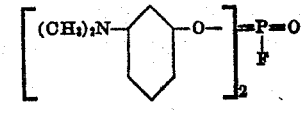
XV. 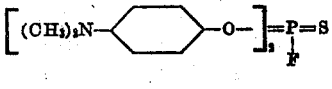
XVI. 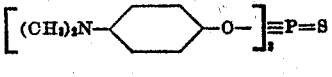
XVII. 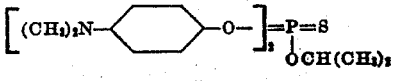
XVIII. 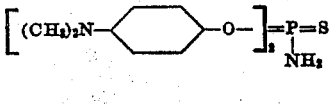
XIX. 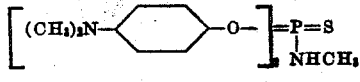
XX. 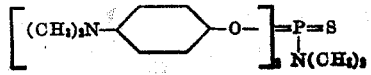
XXI. 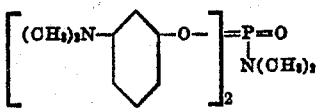
XXII. 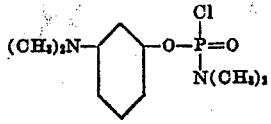
XXIII. 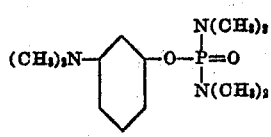
XXIV. 
XXV. 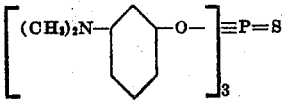
XXVI. 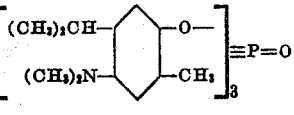
XXVII. 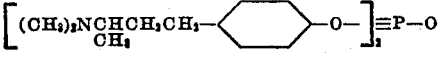
XXVIII. 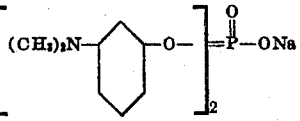
XXIX. 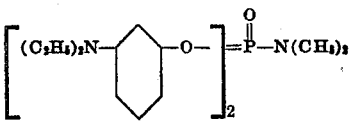
XXX. 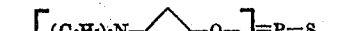
XXXI. 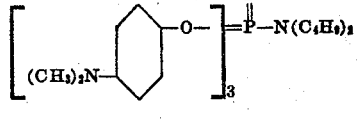
XXXII. 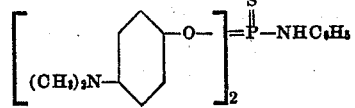
XXXIII. 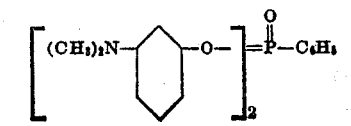

XXXIV. 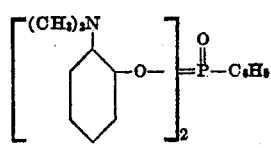
XXXV. 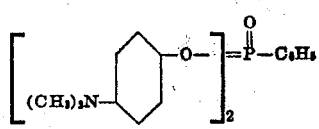
XXXVI. 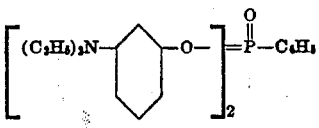
XXXVII. 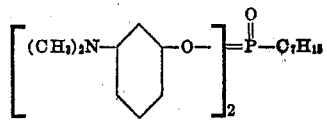
XXXVIII. 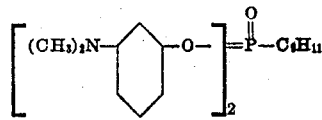
XXXIX. 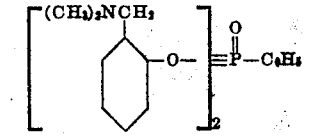
XL. 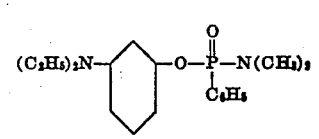
XLI. 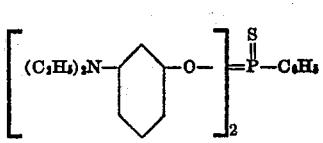
XLII. 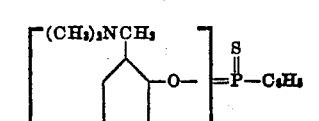
XLIII. 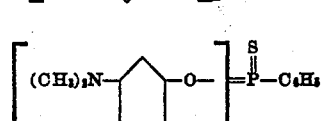
XLIV. 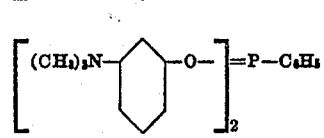
XLV. 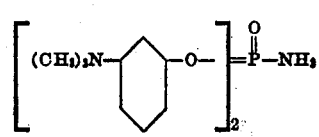
XLVI.
XLVII.
XLVIII.
XLIX.
L.
LI.
LII.
LIII.
LIV.

LV.
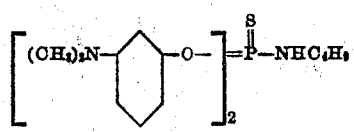
LVI.
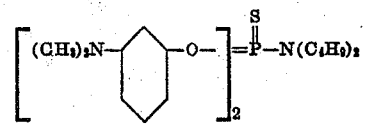
LVII.
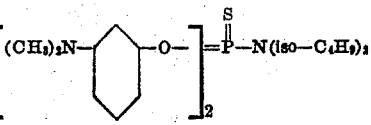
LVIII.
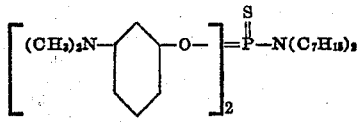
LIX.
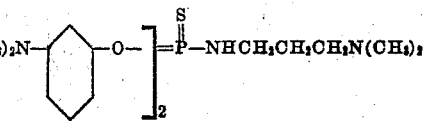
LX.
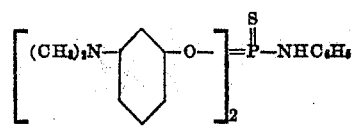
LXI.
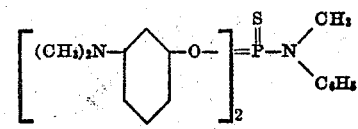
LXII.
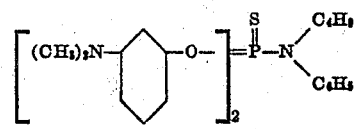
LXIII.
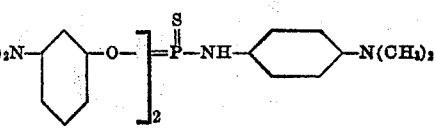
LXIV.
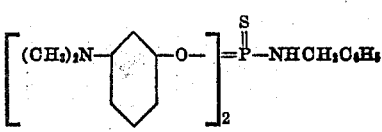
LXV.
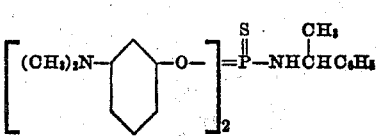
LXVI.
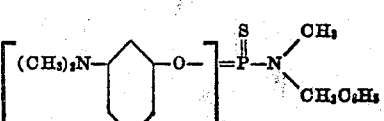
LXVII.
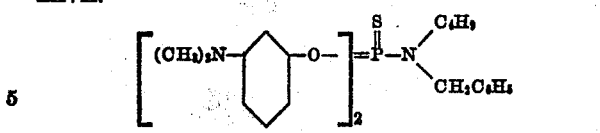
LXVIII.
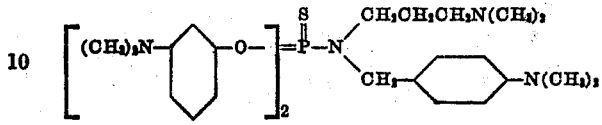
LXIX.
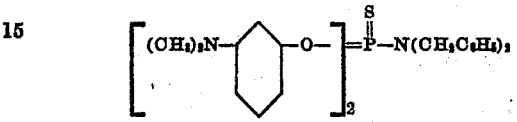
LXX.
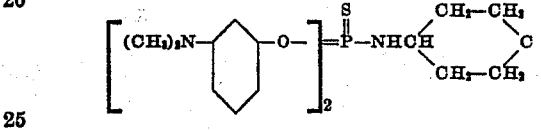
LXXI.
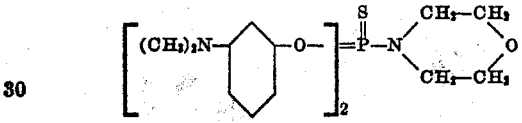
LXXII.
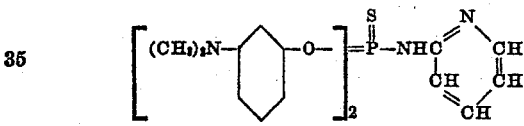
LXXIII.
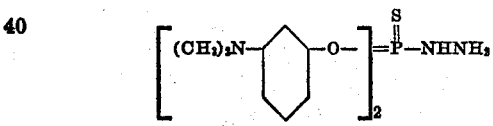
LXXIV.
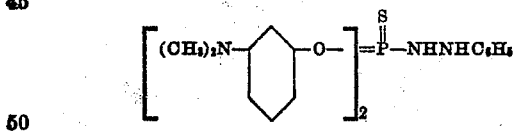
LXXV.
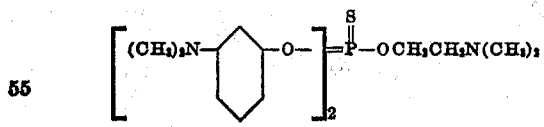
LXXVI.
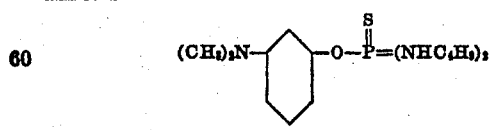
LXXVII.
LXXVIII.
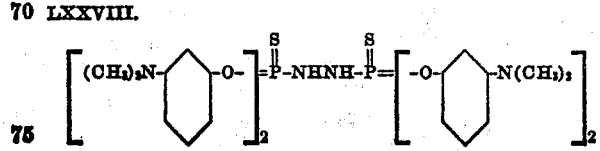

LXXIX.

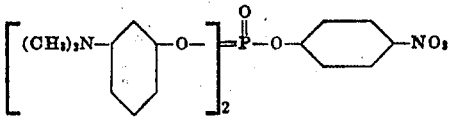

LXXX.

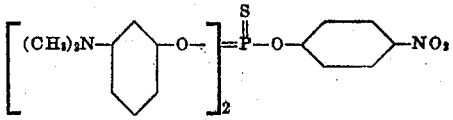

EXAMPLE I

Tri-(m-dimethylaminophenyl) phosphate

A solution of 4.9 g. phosphorus oxychloride (0.032 mole) in 150 cc. benzene is slowly added with stirring during ¾ hour to a solution of 13.7 g. m-dimethylaminophenol (0.10 mole) and 10.1 g. triethylamine (0.10 mole) in 200 cc. benzene. The reaction mixture, protected from moisture, is kept at 5 to 8° C. by cooling during the addition. Stirring is continued, and the mixture is slowly warmed to 25° C. during 2 hours, then heated to 60° C. and maintained at 60–65° C. for about 4 hours. After standing overnight at room temperature, the mixture is filtered from 12.5 g. triethylamine hydrochloride. The filtrate is washed with 150 cc. N NaOH solution in two portions, then with three 50 cc. portions of saturated brine, and dried over calcium sulfate. Removal of benzene by distillation under reduced pressure leaves 12.7 g. of reddish-brown oil. This is stirred with 400 cc. ether and filtered from a small amount of flocculent solid. The ether is distilled from the filtrate, leaving 12.3 g. crude tri-(m-dimethylaminophenyl) phosphate (85% theory) as a light brown oil.

The crude product is purified by distillation in a molecular still at about 200° C. and 1 micron pressure. The distilled oil crystallizes readily and may be further purified by crystallization from dilute alcohol, dilute acetone, and a mixture of benzene and petroleum ether. The pure phosphate is a white solid, M. P. 48–9° C.

The phosphate may also be prepared by heating m-dimethylaminophenol (0.05 mole) and phosphorus oxychloride (0.015 mole) in pyridine (0.5 mole) at 100° C. for 6 hours.

The trimethiodide is prepared from an acetone solution of the base plus 10% excess methyl iodide at room temperature and is crystallized by adding excess absolute alcohol to a solution in 50% alcohol. The trimethiodide, which crystallizes with one molecule of water, is a white solid melting with gas evolution at 193–4.5° C. Drying in a vacuum over phosphorus pentoxide at 85° C. results in slow decomposition of the methiodide. The anhydrous trimethiodide, which is obtained by crystallizing from a 6:1 mixture of methanol and 50% alcohol, is a white solid melting with gas evolution at 207–12° C.

The tripicrate salt, prepared in absolute alcohol and crystallized from methanol, is a bright yellow solid, M. P. 139.5–40.5° C.

The methomethyl sulfate, hydrochloride, sulfate, perchlorate, and oxalate salts are water-soluble non-crystalline solids or oils.

EXAMPLE II

Tri-(m-diethylaminophenyl) phosphate 9.20 grams phosphorus oxychloride (0.06 mole) is added with stirring at 6–13° C. during 15 minutes to a solution of 24.8 g. m-diethylaminophenol (0.15 mole) in 150 cc. of 2 N NaOH under nitrogen. The mixture is warmed to 25° C. during 35 minutes, then extracted with 400 cc. benzene. The benzene extract is washed with water, dried over sodium sulfate and freed of solvent by distillation under reduced pressure. An oil is obtained that contains some m-diethylaminophenol. This is removed by extracting an ether solution of the oil with N NaOH solution. The caustic-insoluble fraction obtained by distilling off the ether is 9.83 g. of yellow oil (36% theory). When distilled in a molecular still at about 200° C. and 1 micron pressure, a colorless, viscous oil is obtained, $n_D^{25}$ 1.5796.

The trimethiodide crystallizes with five molecules of water as a white solid that begins to soften and decompose with gas evolution at about 90° C. and completely melts at about 133° C.

EXAMPLE III

Tri-(o-dimethylaminophenyl) phosphate

This compound is prepared from o-dimethylaminophenol by the method of Example I and purified by distillation in a molecular still at about 200° C. and 1–2 microns pressure. It is a pale yellow oil, $n_D^{25}$ 1.5792.

It may also be prepared by reacting a benzene suspension of sodium o-dimethylaminophenate with phosphorus oxychloride.

EXAMPLE IV

Tri-(p-dimethylaminophenyl) phosphate

This compound is prepared from p-dimethylaminophenol by the method of Example I and purified by crystallization from isopropanol and from a mixture of benzene and petroleum ether. It is obtained as white needles, M. P. 92.5–3° C.

Its trimethiodide crystallizes with two molecules of water and melts with gas evolution at 160–1° C. Drying in a vacuum over phosphorus pentoxide at 85° C. results in slow decomposition of the methiodide.

EXAMPLE V

Tri-(o-dimethylaminomethylphenyl) phosphate

This compound is prepared from o-dimethylaminomethylphenol by the method of Example I and purified by distillation in a molecular still at about 175° C. and 2–4 microns pressure. It is a pale yellow oil, $n_D^{25}$ 1.5443. Its trimethiodide crystallizes with two molecules of water and melts at 232–2.5° C. with gas evolution.

When dried to constant weight in a vacuum over phosphorus pentoxide at 85° C., the trimethiodide loses 2.33% of its weight, leaving one molecule of water still present.

EXAMPLE VI

Tri-(p-dimethylaminomethylphenyl) phosphate

This compound is prepared from p-dimethylaminomethylphenol by the method of Example I, except that the phosphorus oxychloride is added at 50–50° C. and the reaction mixture is stirred at 50–55° C. for 5 hours. The product is purified by a fractional extraction into dilute hydrochloric acid as described by Morton, "Laboratory Technique in Organic Chemistry," page 198. The most basic fractions are purified by crystallization of the acid trioxalate salt from methanol. The salt is obtained as white needles melting at 114–5° C. with gas evolution.

Conversion of the trioxalate salt to the base gives an oil that distills in a molecular still at about 200–225° C. at 10–20 microns pressure. The distillate is a colorless viscous oil, $n_D^{25}$ 1.5419.

The trimethiodide salt is prepared in acetone. When dissolved in a little water and precipitated by adding absolute alcohol, it crystallizes with 3 molecules of water and melts at 164–6° C. with gas evolution in an evacuated tube.

When dried in a vacuum over phosphorus pentoxide at 100° C., the trimethiodide loses 2.57% of its weight, leaving one molecule of water still present.

Crystallization of the more acidic fractions from the fractional extraction from a mixture of isopropanol and ether yields a small amount of di-(p-dimethylaminomethylphenyl) phosphate (VIa) as white crystals melting at 212–6° C. with decomposition.

EXAMPLE VII

*Tri-(1-dimethylaminomethyl-2-naphthyl) phosphate*

This compound is prepared from 1-dimethylaminomethyl-2-naphthol by the method of Example I, except that the phosphorus oxychloride is added at 60–65° C., and the reaction mixture is stirred at 60–65° C. for 6 hours. Purification by crystallization from a mixture of benzene and petroleum ether yields a white solid, M. P. 106–7° C.

EXAMPLE VIII

*Tri-(1-piperidinomethyl-2-naphthyl) phosphate*

This compound, prepared from 1-piperidinomethyl-2-naphthol by the method of Example VII and purified by crystallization from ethyl acetate, is obtained as white needles, M. P. 206–7° C.

EXAMPLE IX

*Tri-(2-piperidinomethyl-1-naphthyl) phosphate*

This compound, prepared from 2-piperidinomethyl-1-naphthol by the method of Example VII and purified by crystallization from a mixture of benzene and petroleum ether, is obtained as white crystals, M. P. 169–71° C. The trihydrochloride crystallizes with two molecules of water as white needles that soften at about 230° C. and melt with gas evolution at 235–8° C.

EXAMPLE X

*Tri-(m-dimethylaminophenyl) phosphite*

A solution of 2.20 g. phosphorus trichloride (0.016 mole) in 100 cc. benzene is slowly added with stirring during 1 hour to a solution of 6.86 g. m-dimethylaminophenol (0.05 mole) and 4.85 g. triethylamine (0.048 mole) in 50 cc. benzene at 70–75° C. The reaction mixture, protected from moisture, is stirred at 70–75° C. for 3 hours. After standing overnight at room temperature, triethylamine hydrochloride is removed by filtration, and the filtrate is washed with two 60 cc. portions of N NaOH solution and three 25 cc. portions of water and dried over calcium sulfate. Removal of benzene by distillation under reduced pressure leaves 6.22 g. solid. This is crystallized from 95% alcohol and from methanol, yielding 5.04 g. white needles (72% theory), M. P. 65–6° C.

The phosphite may also be prepared by reacting phosphorus trichloride with a suspension of sodium m-dimethylaminophenate in ether.

The trimethiodide is prepared from an acetone solution of the base plus excess methyl iodide and is purified by crystallization from a mixture of methanol and ether. It is hygroscopic and is obtained as white needles melting at 182–5° C. with gas evolution containing 3 molecules of water. Drying in a vacuum over phosphorus pentoxide at 85° C. results in a slow decomposition of the trimethiodide.

EXAMPLE XI

*Tri-(p-dimethylaminophenyl) phosphite*

This compound is prepared from p-dimethylaminophenol by the method of Example X and purified by crystallization from a mixture of acetone and 95% alcohol. It is obtained as white crystals, M. P. 68.5–9.5° C.

Its trimethiodide crystallizes with 3 molecules of water, partially melts at 102–9° C. with gas evolution and completely melts at 135° C. Drying in a vacuum over phosphorus pentoxide at 85° C. results in slow decomposition.

EXAMPLE XII

*Di-(p-dimethylaminophenyl) thiophosphoryl chloride*

A solution of 8.73 g. p-dimethylaminophenol (0.064 mole) and 6.58 g. triethylamine (0.065 mole) in 100 cc. benzene is added with stirring during 1 hour to a solution of 5.34 g. phosphorus thiochloride (0.032 mole) in 150 cc. benzene at 22–30° C. The reaction mixture is heated to 70° C. during 1 hour, stirred at 70–75° C. for 3 hours and filtered hot from 7.36 g. triethylamine hydrochloride. The filtrate is concentrated to about 25 cc. on a steam bath, diluted with 50 cc. isopropanol and filtered, yielding 8.25 g. (71% theory) of crude di-(p-dimethylaminophenyl) thiophosphoryl chloride. When purified by crystallization from a mixture of benzene and isopropanol and from isopropanol, long white needles melting at 165.5–6.5 ° C. are obtained.

The dimethiodide crystallizes with one molecule of water as cream-colored plates melting at 165–7° C. with gas evolution.

EXAMPLE XIII

*Di-(m-dimethylaminophenyl) thiophosphoryl chloride*

This compound is prepared from m-dimethylaminophenol by the method of Example XII and purified by distillation in a molecular still at about 175° C. and 1 micron pressure. It is obtained as a pale yellow oil, $n_D^{25}$ 1.6135.

EXAMPLE XIV

*Di-(m-dimethylaminophenyl)phosphoryl fluoride*

A solution of 13.71 g. m-dimethylaminophenol (0.10 mole) and 10.11 g. triethylamine (0.10 mole) in 200 cc. benzene is added with stirring during 2 hours to a solution of 7.68 g. phosphorus oxychloride (0.05 mole) in 100 cc. benzene at 21–32° C. After stirring at this temperature for 2 hours longer, the mixture is heated to 65° C. during 1 hour and held at 65–70° C. for 1 hour, then left overnight at room temperature and filtered from 13.18 g. triethylamine hydrochloride. Without isolating the di-(m-dimethylaminophenyl) phosphoryl chloride, thus obtained, from the filtrate, 3.70 g. dry ammonium fluoride (0.10 mole) is added and the mixture is stirred at 65–70° C. for 14 hours, left at room temperature overnight, and filtered from 8.59 g. insoluble solid. Removal of benzene from the filtrate by distillation under reduced pressure leaves an oil, which is stirred with 600 cc. ether and decanted from some insoluble tar. Removal of ether on the steam bath leaves 14.08 g. crude di-(m-dimethylaminophenyl) phosphoryl fluoride as a light-red oil that does not give a Beilstein test for chlorine. When purified by distillation in a molecular still at about 150–200° C. at 5–8 microns pressure, 8.18 g. (48% theory) of pale yellow liquid is obtained, $n_D^{25}$ 1.5651. The monomethiodide is an amorphous, deliquescent, pale yellow solid that softens at about 70° C. and melts with gas evolution at 95–105° C.

EXAMPLE XV

*Di-(p-dimethylaminophenyl) thiophosphoryl fluoride*

2.31 grams di-(p-dimethylaminophenyl) thiophosphoryl chloride (0.006 mole) and 0.37 g. ammonium fluoride (0.010 mole) in 150 cc. isopropanol is stirred at 75–80° C. for 5 hours, and the resulting solution is decanted hot from a little insoluble solid. The isopropanol solution is concentrated to about 20 cc., decanted from a little more insoluble solid, diluted with 100 cc. water, iced and filtered from 1.62 g. of crude di-(p-dimethylaminophenyl) thiophosphoryl fluoride (78% theory). Crystallization from 90% alcohol and from isopropanol yields flat white needles melting at 110.5–12° C.

The fluoride may also be prepared by heating di-(p-dimethylaminophenyl) thiophosphoryl chloride with sodium fluoride in isopropanol.

The dimethiodide crystallizes with two molecules of water as small white plates melting at 159–62° C. with gas evolution.

EXAMPLE XVI

*Tri-(p-dimethylaminophenyl) thiophosphate*

1.86 grams of di-(p-dimethylaminophenyl) thiophosphoryl chloride (0.005 mole) was added to a solution of 0.79 g. sodium p-dimethylaminophenate (0.005 mole) in 20 cc. isopropanol. The mixture was left at room temperature with occasional stirring for a week, then filtered from 2.06 g. brown solid. The solid was stirred well with 100 cc. ether and filtered from some unchanged di-(p-dimethylaminophenyl) thiophosphoryl chloride. Evaporation of ether from the filtrate left 1.01 g. crude tri-(p-dimethylaminophenyl) thiophosphate (43% theory). This was purified by treating a solution in 0.5 N HCl with Darco, precipitating the base with excess NaOH solution, and crystallizing from 95% alcohol and from isopropanol. It was obtained as white needles melting at 127.5–9° C.

The thiophosphate may also be prepared by stirring a mixture of 12.34 g. p-dimethylaminophenol (0.090 mole), 9.10 g. triethylamine (0.090 mole), 4.57 g. thiophosphoryl chloride (0.027 mole) and 0.45 g. phosphorus trichloride (0.003 mole) in 250 cc. toluene at 80–85° C. for 24 hours.

The trimethiodide, which crystallizes with six molecules of water, is obtained as white needles melting at 162–4° C. with gas evolution.

The trihydrochloride crystallizes with a molecule of water as a white solid that turns pink at about 205° C. and melts with gas evolution at 222–3° C. The trihydrochloride is soluble in a little water, but does not remain completely in solution on dilution unless excess acid is present.

EXAMPLE XVII

Di-(p-dimethylaminophenyl)isopropyl thiophosphate 1.86 grams di-(p-dimethylaminophenyl) thiophosphoryl chloride (0.005 mole) is added to a solution of 0.114 g. sodium (0.005 mole) in 20 cc. isopropanol. The mixture is heated to boiling, then left at room temperature with occasional stirring for 4 days and filtered from sodium chloride and unchanged thiophosphoryl chloride. Removal of solvent from the filtrate under reduced pressure leaves 1.24 g. crude di-(p-dimethylaminophenyl) isopropyl thiophosphate (63% theory). When purified by crystallization from methanol and from isopropanol, colorless needles melting at 74–6° C. are obtained. The dimethiodide crystallizes with three molecules of water as white needles melting at 177–7.5° C. with gas evolution.

EXAMPLE XVIII

Di-(p-dimethylaminophenyl) ester of aminothiophosphonic acid

To a suspension of 1.48 g. di-(p-dimethylaminophenyl) thiophosphoryl chloride (0.004 mole) in 10 cc. acetone is added 1.0 cc. concentrated ammonium hydroxide (0.015 mole). After an hour of occasional stirring at room temperature, the thiophosphoryl chloride dissolves. The solution is left at room temperature overnight, then diluted with 100 cc. water and filtered. The precipitate is 1.36 g. crude di-(p-dimethylaminophenyl) ester of aminothiophosphonic acid (97% theory). When purified by crystallization from a mixture of ethyl acetate and 95% alcohol and from isopropanol, long white needles melting at 162–3° C. are obtained.

The dimethiodide crystallizes with four molecules of water as white crystals that soften about 170° C. and melt at 180–181° C. with gas evolution.

EXAMPLE XIX

Di-(p-dimethylaminophenyl) ester of methylaminothiophosphonic acid

This compound is prepared by the method of Example XVIII, using excess 25% methylamine solution instead of ammonium hydroxide, and is purified by crystallization from 95% alcohol and from isopropanol. Short white needles melting at 112.5–4° C. are obtained.

The dimethiodide crystallizes with three molecules of water as long white needles melting at 148–51° C. with gas evolution.

EXAMPLE XX

Di-(p-dimethylaminophenyl) ester of dimethylaminothiophosphonic acid

This compound is prepared by the method of Example XVIII, using excess dimethylamine instead of ammonium hydroxide and using benzene as the solvent. When purified by crystallization from methanol, it is obtained as white needles melting at 103–5.5° C.

The dimethiodide crystallizes with two molecules of water as light tan crystals melting at 181–4° C. with gas evolution.

EXAMPLE XXI

Di-(m-dimethylaminophenyl) ester of dimethylaminophosphonic acid

Excess dimethylamine is added to a benzene solution of di-(m-dimethylaminophenyl) phosphoryl chloride, prepared as described in Example XIV. The mixture is stirred at 30–40° C. for 6 hours, left overnight at room temperature and filtered from dimethylamine hydrochloride. The filtrate is washed with N NaOH solution and with saturated brine and dried over calcium sulfate. Removal of solvent by distillation under reduced pressure leaves the crude di-(m-dimethylaminophenyl) ester of dimethylaminophosphonic acid as a brown oil (87% theory). Distillation in a molecular still at about 200–225° C. at 1–2 microns pressure gives a colorless oil, $n_D^{25}$ 1.5760.

The compound may also be prepared by reacting dimethylaminophosphonyl chloride with sodium m-dimethylaminophenate and by reacting dimethylaminophosphonyl chloride with m-dimethylaminophenol in the presence of triethylamine.

The dimethiodide crystallizes with one molecule of water as white crystals melting at 171–2° C. with decomposition.

EXAMPLE XXII m-Dimethylaminophenyl ester of dimethylaminophosphonyl chloride

A solution of 6.86 g. m-dimethylaminophenol (0.05 mole) and 5.05 g. triethylamine (0.05 mole) in 150 cc. benzene is slowly added with stirring during 1 hour to a solution of 8.10 g. dimethylaminophosphonyl chloride (0.05 mole) in 150 cc. benzene. The mixture is stirred at room temperature for an hour longer, then at 60–65° C. for 9 hours. After cooling, the mixture is filtered from 5.54 g. triethylamine hydrochloride, and solvent is removed from the filtrate by distillation under reduced pressure. The residue (11 g.) is purified by distillation. The distillate, B. P. 148–151° C./0.5 mm., is 7.14 g. (54% theory) of pale yellow oil, $n_D^{25}$ 1.5450.

The methiodide crystallizes with one-half molecule of water as a white solid melting at 137.5–9° C.

EXAMPLE XXIII m-Dimethylaminophenyl ester of di-(dimethylamino)-phosphinic acid

A solution of 2.0 g. dimethylamine (0.044 mole) in 8 cc. benzene is added with stirring to a solution of 3.67 g. m-dimethylaminophenyl ester of dimethylamino phosphonyl chloride (0.014 mole) in 20 cc. benzene. A precipitate forms at once. After standing 3 days at room temperature, the mixture is washed with N NaOH solution and with saturated brine and dried over calcium sulfate. The solvent is distilled off under reduced pressure, and the residue is purified by distillation. 2.44 grams (63% theory) of pale yellow oil is obtained, B. P. 155–60° C./0.5 mm., $n_D^{25}$ 1.5322.

The methiodide is obtained as white crystals melting at 146–7° C.

EXAMPLE XXIV

*Di-(p-dimethylaminophenyl) thiophosphoryl bromide*

This compound is prepared from p-dimethylaminophenol and phosphorus thiobromide by the method of Example XII and purified by crystallization from carbon tetrachloride and from a mixture of toluene and petroleum ether. It is obtained as white crystals melting at 158–64° C.

The dimethiodide crystallizes with two molecules of water as a pale yellow solid melting with gas evolution at 137–41° C.

EXAMPLE XXV

*Tri-(m-dimethylaminophenyl) thiophosphate*

This compound is prepared from di-(m-dimethylaminophenyl) thiophosphoryl chloride and sodium m-dimethylaminophenate by the method of Example XVI. When purified by distillation in a molecular still at about 200° C. and 1–2 microns pressure and by crystallization from isopropanol, and from a mixture of acetone and 95% alcohol, it is obtained as white crystals melting at 55.5–6.5° C.

A preferred method of preparing tri-(m-dimethylaminophenyl) thiophosphate is as follows. To a solution of sodium m-dimethylaminophenate prepared by adding 139.9 g. m-dimethylaminophenol (1.02 moles) to a solution of 23.46 g. sodium (1.02 moles) in 229 cc. isopropanol (3 moles) and 1 liter of dry benzene under an atmosphere of dry nitrogen is added 57.6 g. phosphorus thiochloride in 50 cc. dry benzene with stirring at 2–4° C. during 2½ hours. The mixture is left in a refrigerator at 2–4° C. overnight and then at room temperature for 6 days. The mixture, which contains a flocculent precipitate, is washed with 200 cc. water, then with 100 cc. water and with two 50 cc. portions of saturated sodium chloride solution, and is stirred well with 3 g. Darco and 25 g. anhydrous calcium sulfate, and filtered. Distillation of solvent from the filtrate under reduced pressure to 98° C./20 mm. leaves 160.4 g. of viscous dark-red oil. This is dissolved in 100 cc. acetone, iced, slowly diluted with 1 liter of cold 95% alcohol and filtered. The precipitate, washed on the filter with 200 cc. cold 95% alcohol and air-dried, is 136.3 g. (85% theory) of light tan crystals, M. P. 53–5° C. To 118.0 g. (0.25 mole) of the tri-(m-dimethylaminophenyl) thiophosphate thus obtained in 60 cc. acetone is added 127.8 g. methyl iodide (0.75 mole plus 20% excess) and left at room temperature in a tightly stoppered flask for 5 days. The product is crystallized from 1 liter of methanol plus 100 cc. water and then from 1 liter methanol plus 90 cc. water, giving 197.1 g. (85% theory) of tri-(m-dimethylaminophenyl) thiophosphate trimethiodide dihydrate as white crystals.

The trimethiodide crystallizes with two molecules of water as a white solid melting at 178.5–81° C. with gas evolution.

The trimethobromide crystallizes with 5 molecules of water as white needles melting at 160–2° C.

The triethiodide crystallizes with 6 molecules of water as a pale yellow solid that melts with gas evolution at 115–20° C.

The trihydrochloride is obtained as white crystals melting with gas evolution at 168–9.5° C. It is soluble in a little water but does not remain completely in solution when diluted unless excess acid is present.

EXAMPLE XXVI

*Tri-(2-methyl-4-dimethylamino-5-isopropylphenyl) phosphate*

This compound is prepared from p-dimethylaminocarvacrol by the method of Example I. Crystallization from dilute alcohol and from ethylene glycol monoethyl ether yields white crystals melting at 119.5–20.5° C.

Its acid trioxalate salt is obtained as white crystals melting at 153–6° C. with gas evolution.

The trimethiodide crystallizes with 5 molecules of water as white needles melting with gas evolution at 105–6° C.

EXAMPLE XXVII

*Tri-[p-(3-dimethylaminobutyl)phenyl] phosphate*

This compound is prepared from p-(3-dimethylaminobutyl) phenol by the method of Example I, except that the phosphorus oxychloride is added during one-half hour at 55–60° C. and the reaction mixture is stirred at 55–60° C. for 4 hours. When purified by distillation in a molecular still at about 300° C. and 2 microns pressure, it is obtained as a colorless oil, $n_D^{25}$ 1.5299.

The trimethiodide crystallizes with one molecule of water as a white solid melting at 158–60° C. with gas evolution.

EXAMPLE XXVIII

*Di-(m-dimethylaminophenyl) sodium phosphate*

A benzene solution of di-(m-dimethylaminophenyl) phosphoryl chloride is prepared as described in Example XIV, and the benzene is removed by distillation under reduced pressure. The residue is dissolved in isopropanol, treated with an equimolar quantity of 10 N NaOH solution, and the product is thrown down by adding excess ether. Crystallization from isopropanol yields long white needles that partially melt and turn red at about 228° C. and decompose at about 260° C.

EXAMPLE XXIX

*Di-(m-diethylaminophenyl) ester of dimethylamino phosphonic acid*

This compound, prepared from di-(m-diethylaminophenyl) phosphoryl chloride by the method of Example XXI and purified by distillation in a molecular still at about 225° C. and 1 micron pressure, is obtained as a colorless oil, $n_D^{25}$ 1.5595.

The dimethiodide is obtained as white crystals melting at 177–8° C. with gas evolution.

EXAMPLE XXX

*Tri-(m-diethylaminophenyl) thiophosphate*

This compound, prepared by the method of Example XVI and purified by distillation in a molecular still at 300–325° C. and 2 microns pressure, is obtained as a pale yellow oil, $n_D^{25}$ 1.5948.

The dimethiodide crystallizes with two molecules of water as a white solid melting at 166–71° C. with gas evolution.

EXAMPLE XXXI

*Di-(p-dimethylaminophenyl) ester of dibutylamino thiophosphonic acid*

A mixture of 2.97 g. di-(p-dimethylaminophenyl) thiophosphoryl chloride (0.008 mole) and 4.13 g. di-n-butylamine (0.032 mole) is boiled under reflux for 1 hour, cooled, diluted with 100 cc. ether and filtered from 1.28 g. di-n-butylamine hydrochloride. Ether is distilled from the filtrate, and the residue is distilled in a molecular still at about 225° C. and 1 micron pressure, yielding 2.33 g. (60% theory) of pale yellow oil, $n_D^{25}$ 1.5716.

The dimethiodide is obtained as white needles melting at 181–3° C. with gas evolution.

EXAMPLE XXXII

*Di-(p-dimethylaminophenyl) ester of phenylamino thiophosphonic acid*

This compound, prepared by the method of Example XXXI using aniline in place of dibutylamine and purified by crystallization from a mixture of benzene and isopropanol, is obtained as long white needles melting at 177–80° C.

The dimethiodide is obtained as small white needles melting at 177–8° C. with gas evolution.

EXAMPLE XXXIII

*Di-(m-dimethylaminophenyl) ester of benzene phosphonic acid*

5.85 grams of benzene phosphorus oxydichloride (0.03 mole) in 50 cc. benzene is added with stirring to a solution of 8.22 g. m-dimethylaminophenol (0.06 mole) and 6.08 g. triethylamine (0.06 mole) in 150 cc. benzene during ½ hour. The temperature increases from 26 to 36° C. and a precipitate forms during the addition. The mixture is heated to 65° C. during ¼ hour, stirred at 65 to 70° C. for 6 hours, cooled and filtered from 7.96 g. triethylamine hydrochloride. Benzene is removed from the filtrate by distillation under reduced pressure. The residue is taken up in 300 cc. ether, stirred with 0.5 g. Darco, dried over calcium sulfate, filtered, and ether is removed by distillation on a steam bath. The residue is 11.49 g. (97% theory) of a yellow oil that solidifies on cooling. Purification by crystallization from 80% alcohol gives short colorless rods melting at 90–91° C.

The dimethiodide crystallizes from a mixture of methanol and isopropanol as a white solid melting at 192–4° C. with gas evolution.

EXAMPLE XXXIV

*Di-(o-dimethylaminophenyl) ester of benzene phosphonic acid*

This compound is prepared from o-dimethylamino phenol and benzene phosphorus oxydichloride by the method of Example XXXIII. When purified by distillation in a molecular still at about 200°C. and 2 to 4 microns pressure, it is obtained as a colorless oil, $n_D^{25}$ 1.5864.

The monomethiodide is obtained from a mixture of isopropanol and ether as an amorphous, hygroscopic solid that contains about 5 molecules of water and melts indefinitely at 78–95° C. with gas evolution.

EXAMPLE XXXV

*Di-(p-dimethylaminophenyl) ester of benzene phosphonic acid*

This compound is prepared from p-dimethylaminophenol and benzene phosphorus oxydichloride by the method of Example XXXIII. When crystallized from 95% alcohol and from methylethyl ketone, it is obtained as white needles that melt at 173–5° C.

The dimethiodide crystallizes with one molecule of water as white needles melting at 162–4° C. with gas evolution.

EXAMPLE XXXVI

*Di-(m-diethylaminophenyl) ester of benzene phosphonic acid*

This compound is prepared from m-diethylaminophenol and benzene phosphorus oxydichloride by the method of Example XXXIII. When purified by distillation in a molecular still at about 250° C. and 1 micron pressure, it is obtained as a colorless oil, $n_D^{25}$ 1.5887. The oil slowly solidifies, and crystallization from dilute alcohol gives white needles melting at 37–8° C.

The monomethiodide is obtained as fluffy white needles melting at 147–8° C. with gas evolution.

The dimethiodide is obtained as a pale pink solid melting indefinitely at 98–111° C. with gas evolution and containing one molecule of water.

EXAMPLE XXXVII

*Di-(m-dimethylaminophenyl) ester of heptane phosphonic acid*

This compound is prepared from m-dimethylaminophenol and heptane phosphorus oxydichloride (J. Am. Chem. Soc. 70, 3880 (1948)) by the method of Example XXXIII. When purified by distillation in a molecular still at about 225° C. and 1 micron pressure, it is obtained as a pale yellow oil, $n_D^{25}$ 1.5550.

The dimethiodide is a pale yellow, amorphous deliquescent solid that melts indefinitely at 90–115° C. with gas evolution.

EXAMPLE XXXVIII

*Di-(m-dimethylaminophenyl) ester of cyclohexane phosphonic acid*

This compound is prepared from m-dimethylaminophenol and cyclohexane phosphorus oxydichloride (J. Am. Chem. Soc. 70, (1948)) by the method of Example XXXIII. When purified by distillation in a molecular still at 250–275° C. and 1 micron pressure, it is obtained as a pale amber oil, $n_D^{25}$ 1.5782.

The dimethiodide is obtained as white crystals melting at 202–4° C. with gas evolution.

EXAMPLE XXXIX

*Di-(o-dimethylaminomethylphenyl) ester of benzene phosphonic acid*

This compound is prepared from o-dimethylaminomethylphenol and benzene phosphorus oxydichloride by the method of Example XXXIII. When purified by distillation in a molecular still at about 225° C. and 6–8 microns pressure, it is obtained as a colorless oil, $n_D^{25}$ 1.5609.

The dihydrobromide is obtained as white crystals melting at 232.5–3.5° C.

The dimethiodide is obtained as a light cream-colored solid that softens at 127° C., melts indefinitely at about 175° C. with gas evolution, and contains five molecules of water.

EXAMPLE XL

*m-Diethylaminophenyl ester of (P)-benzene-(P)-dimethylamino phosphinic acid*

A solution of 16.52 g. m-dimethylaminophenol (0.10 mole) and 10.11 g. triethylamine (0.10 mole) in 150 cc. benzene is slowly added with stirring during 1.5 hours to 19.50 g. benzene phosphorus oxydichloride in 50 cc. benzene. The temperature increases from 29 to 40° C. and a precipitate forms during the addition. After stirring at 31 to 40° C. for 1.5 hours, the mixture is heated to 65° C. and held at 65–70° C. for 1 hour. The solution of m-diethylaminophenyl ester of benzene phosphonyl chloride thus obtained is cooled to 28° C., and 10.82 g. dimethylamine (0.24 mole) in 40 cc. benzene is added with stirring during ½ hour. The mixture is then left overnight at room temperature and is filtered from triethylamine and dimethylamine hydrochlorides. Benzene is removed from the filtrate by distillation under reduced pressure. The residue is taken up in 400 cc. ether, stirred with 0.5 g. Darco, dried over calcium sulfate, filtered, and ether removed by distillation on a steam bath. The residue is 30.47 g. (92% theory) of pale yellow oil. Purification by distillation at about 200° C. and 4–8 microns pressure gives a colorless oil, $n_D^{25}$ 1.5682.

The methiodide is obtained as white crystals melting at 131–2° C. with gas evolution.

EXAMPLE XLI

*Di-(m-diethylaminophenyl) ester of benzenethiophosphonic acid*

To a solution of sodium m-diethylaminophenate (prepared by adding 16.52 g. m-diethylaminophenol (0.10 mole) in 150 cc. benzene to a solution of 2.29 g. sodium in 30 cc. isopropanol plus 30 cc. benzene under nitrogen) is added 10.56 g. benzene phosphorus thiodichloride (0.05 mole) during ¼ hour with stirring and cooling to maintain the temperature at 20–30° C. After standing at room temperature for 4 days, solvent is removed by distillation under reduced pressure. The residue is taken up in 350 cc. ether, stirred with 0.5 g. Darco, dried over calcium sulfate, filtered, and ether removed by distillation on a steam bath. The residue is 19.59 g. (83% theory) of pale red oil. Purification by distillation in a molecular still at about 275° C. and 1 micron pressure gives a pale yellow oil, $n_D^{25}$ 1.6099.

The monomethiodide melts at 198–201° C. with gas evolution.

The dimethiodide melts at 144–5° C. with gas evolution.

EXAMPLE XLII

*Di-(o-dimethylaminomethylphenyl) ester of benzenethiophosphonic acid*

This compound is prepared from o-dimethylaminomethylphenol and benzene phosphorus thiodichloride by the method of Example XLI. When purified by distillation in a molecular still at 200–255° C. and 6–10 microns pressure, it is obtained as a pale yellow oil, $n_D^{25}$ 1.5858.

The dimethiodide is obtained as white crystals melting with decomposition at 214–6° C.

EXAMPLE XLIII

*Di-(m-dimethylaminophenyl) ester of benzenethiophosphonic acid*

This compound is prepared from sodium m-dimethylaminophenate and benzenephosphorusthiodichloride as described in Example XLI. It crystallizes from a mixture of acetone and 95% alcohol as white needles melting at 93–4° C. The dihydrochloride crystallizes with two molecules of water as white needles melting with gas evolution at 189–190.5° C. It is soluble in a little water but does not remain completely in solution when diluted unless excess acid is present. The dimethiodide melts at 182–4° C.

EXAMPLE XLIV

*Di-(m-dimethylaminophenyl) ester of benzenephosphonous acid*

This compound is prepared from m-dimethylaminophenol and benzenephosphorusdichloride as described in Example XXXIII. When purified by distillation in a molecular still at about 150° C. and 2 to 3 microns pressure, it is obtained as a colorless oil, $n_D^{25}$ 1.6280. It reacts with three molecules of methyl iodide to give a trimethiodide in which one molecule of methyl iodide is attached to phosphorus as a phosphonium compound that crystallizes with four molecules of water and melts with gas evolution at 182–5° C.

EXAMPLES XLV AND XLVI

The following compounds are prepared from di-(m-dimethylaminophenyl)phosphoryl chloride and anhydrous ammonia or the corresponding amine as described in Example XXI.

*Example XLV.*—*Di-(m-dimethylaminophenyl) ester of aminophosphonic acid* crystallizes from 50% alcohol as long white needles melting at 141.5–2.5° C. The dimethiodide crystallizes from 95% alcohol as long white needles melting with gas evolution at 182–3.5° C.

*Example XLVI.*—*Di-(m-dimethylaminophenyl) ester of 3-dimethylaminopropylaminophosphonic acid* distills in a molecular still at about 175° C. at 1 micron pressure as a very pale yellow oil $n_D^{25}$ 1.5678. The trimethiodide crystallizes with 3 molecules of water as light tan crystals that melt with gas evolution at 176–81° C.

EXAMPLES XLVII–IL

The following compounds are prepared by reacting the corresponding sodium phenates with an equivalent quantity of phosphorus thiochloride in a mixture of benzene and isopropanol as described in Example XXV. The method used by Caldwell and Thompson (J. Am. Chem. Soc. 61, 2354 (1939)) to prepare 4-piperidinomethyl-2,5-dimethylphenol is used to prepare the corresponding morpholino and pyrrolidino derivatives. The former melts at 148.5–9.5° C. and the latter at 129–30° C.

*Example XLVII.*—*Tri(4-piperidinomethyl-2,5-dimethylphenyl) thiophosphate* crystallizes from dilute alcohol as white crystals of low melting point that fuse to a glassy mass on drying over calcium chloride in vacuo. The tri-acid oxalate (three molecules of oxalic acid per molecule of thiophosphate) crystallizes from 88% alcohol as a white solid that melts with gas evolution at 147–50° C. The trimethiodide crystallizes with 3 molecules of water as a pale tan solid that softens about 175° C. and melts with gas evolution at 185–200° C.

*Example XLVIII.*—*Tri-(4-morpholinomethyl-2,5-dimethylphenyl) thiophosphate* crystallizes from dilute alcohol as a white solid that melts indefinitely at about 57–68° C. The tri-acid oxalate melts at 170–2° C. The trimethiodide crystallizes with 4 molecules of water as a white solid that turns red about 200° C. and melts above 250° C.

*Example IL.*—*Tri-(4-pyrrolidinomethyl-2,5-dimethylphenyl) thiophosphate* crystallizes from absolute alcohol as a white solid melting at 73.5–75° C. The tri-acid oxalate is obtained from absolute alcohol as white crystals melting with gas evolution at 175–8° C. The trimethiodide crystallizes with 2 molecules of water, begins to decompose at about 210° C. and partially melts about 228° C.

EXAMPLE L

*Di-(o-dimethylaminophenyl) isopropyl thiophosphate*

When sodium m-dimethylaminophenate reacts with phosphorus thiochloride in a mixture of benzene and isopropanol as described in Example XXV little, if any, isopropylated ester is formed. When sodium o-dimethylaminophenate is reacted in the same manner, however, the principal product is di-(o-dimethylaminophenyl) isopropyl thiophosphate, a colorless liquid, $n_D^{25}$ 1.5622, that distills at about 100° C. at 1 micron pressure in a molecular still. The monomethiodide crystallizes from isopropanol as white feathery needles that melt with gas evolution at 117–8° C.

EXAMPLE LI

*m-Dimethylaminophenyl diethyl phosphate*

This compound is obtained by reacting m-dimethylaminophenol with diethyl chlorophosphate in the presence of triethylamine as described in Example I. It is a colorless liquid boiling at 150–8° C./0.5 mm., $n_D^{25}$ 1.5100. The methiodide crystallizes from isopropanol with one molecule of water as glistening white plates melting with gas evolution at 114.5–5.5° C.

EXAMPLE LII

*m-Dimethylaminophenyl diethyl thiophosphate*

This compound is prepared from sodium m-dimethylaminophenate and diethyl thiophosphoryl chloride in a mixture of benzene and isopropanol as described in Example XXV. It is a pale yellow liquid boiling at 158–67° C./0.5 mm., $n_D^{25}$ 1.5398. The methiodide crystallizes from isopropanol as large white plates that melt with gas evolution at 129–30° C.

EXAMPLES LIII–LXXIV

Di-(m-dimethylaminophenyl) esters of substituted amino thiophosphonic acids are prepared in the following manner. A solution of 13.71 g. m-dimethylaminophenol (0.10 mole) and 10.11 g. triethylamine (0.10 mole) in 100–200 cc. benzene is added to 8.47 g. phosphorus thiochloride (0.05 mole) in 50–100 cc. benzene with stirring at 3–5° C. during 4–6 hours. The mixture is left at room temperature for 3 days or longer or is heated at about 75° C. for 2–3 hours and cooled and is filtered from triethylamine hydrochloride. In some cases the filtrate is used directly and in other cases solvent is removed by distillation under reduced pressure. To the di - (m - dimethylaminophenyl) thiophosphoryl chloride thus obtained is added 0.10 mole of the appropriate amine, and the mixture is heated to complete the reaction. The excess amine serves as an acid acceptor for the hydrogen chloride formed in the reaction, and the amine hydrochloride is filtered from the reaction mixture (after adding ether or benzene if solvent is removed before the reaction). The filtrate is washed with water, then with 2N sodium hydroxide solution and again with water and with saturated sodium chloride solution, and is dried over calcium sulfate (after stirring with a little Darco if colored impurities are present) and filtered. Solvent is removed by distillation, and the residue is purified by distillation in a molecular still or by crystallization or both. For each example the amount of heating of the reaction mixture and the presence or absence of solvent is noted in parentheses.

*Example LIII.—Di-(m-dimethylaminophenyl) ester of dimethylaminothiophosphonic acid, (heated at 65–70° C. for 5 hours, in benzene).*—The base is a pale yellow oil that distills at about 150° C. at 1 micron pressure, $n_D^{25}$ 1.5990. The dimethiodide crystallizes from absolute alcohol with 3 molecules of water as a pale yellow solid that melts with gas evolution at 146–50° C.

*Example LIV.—Di-(m-dimethylaminophenyl) ester of di-n-propylaminothiophosphonic acid, (heated at 75–80° C. for 10 hours, in benzene).*—The base is obtained from 95% alcohol as white crystals, M. P. 108–9.5° C. The dimethiodide crystallizes from a mixture of acetone and absolute alcohol with 3 molecules of water as a white solid that melts with gas evolution at 161–3° C.

*Example LV.—Di-(m-dimethylaminophenyl) ester of n-butylaminothiophosphonic acid, (heated at 70–75° C. for 6 hours, in benzene).*—The base is a pale yellow oil that distills at about 150° C. at 3–4 microns pressure, $n_D^{25}$ 1.5910. The dimethiodide crystallizes with 1 molecule of water from a mixture of acetone and isopropanol as fluffy white needles melting with gas evolution at 135–7° C.

*Example LVI.—Di-(m-dimethylaminophenyl) ester of di-n-butylaminothiophosphonic acid, (heated at 100° C. for 2½ hours and at 150° C. for 1 hour, no solvent).*— The base is a pale yellow oil that distills at about 160° C. at 3–4 microns pressure, $n_D^{25}$ 1.5689. The dimethiodide crystallizes from a mixture of acetone and absolute alcohol with 3 molecules of water as white crystals that melt with gas evolution at 170–2° C.

*Example LVII.—Di-(m-dimethylaminophenyl) ester of di-iso-butylaminothiophosphonic acid, (heated at 100° C. for 5 hours and at 135° C. for 21 hours, no solvent).*— The base is a yellow oil that distills at about 150° C. at 1 micron pressure, $n_D^{25}$ 1.5696. The dimethiodide crystallizes from isopropanol with 2 molecules of water as white plates that melt with gas evolution at 124–6° C.

*Example LVIII.—Di-(m-dimethylaminophenyl) ester of di-n-heptylaminothiophosphonic acid, (heated at 100° C. for 7 hours and at 135° C. for 14 hours, no solvent).*— The base is a yellow oil that distills at about 200° C. at 1 micron pressure, $n_D^{25}$ 1.5527. The dimethiodide crystallizes from a mixture of acetone and isopropanol as white needles that melt with gas evolution at 160–2° C.

*Example LIX.—Di-(m-dimethylaminophenyl) ester of 3-dimethylaminopropylaminothiophosphonic acid, (heated at 65–70° C. for 5 hours, in benzene).*—The base is a very pale yellow oil that distills at about 150° C. at 1 micron pressure, $n_D^{25}$ 1.5873. The mono-oxalate crystallizes from a mixture of absolute alcohol and isopropanol as white needles, M. P. 122–3° C. The dihydrochloride crystallizes from a mixture of isopropanol and ether as a hygroscopic white solid that softens about 70° C. and melts indefinitely at 78–98° C. The trimethiodide crystallizes from a mixture of absolute alcohol and isopropanol with 1 molecule of water as a pale yellow solid that melts with gas evolution at 125–30° C.

*Example LX.—Di-(m-dimethylaminophenyl) ester of phenylaminothiophosphonic acid, (heated at 100° C. for 2½ hours and at 150° C. for 1 hour, no solvent).*—The base crystallizes from 95% alcohol as white needles, M. P. 97–8° C. The dimethiodide crystallizes from a mixture of methanol and acetone with 1 molecule of water as a white solid that melts with gas evolution at 130–1° C.

*Example LXI.—Di-(m-dimethylaminophenyl) ester of N-methylphenylaminothiophosphonic acid, (heated at 100° C. for 4 hours and at 150° C. for 1 hour, no solvent).*—The base is a pale yellow oil that distills at about 175° C. at 2–3 microns pressure, $n_D^{25}$ 1.6230. The dimethiodide crystallizes from a mixture of methanol and acetone as white crystals that melt with gas evolution at 135–6° C.

*Example LXII.—Di-(m-dimethylaminophenyl) ester of N-n-butylphenylaminothiophosphonic acid, (heated at 100° C. for 7 hours and at 135° C. for 21 hours, no solvent).*—The base is a yellow oil that distills at about 175° C. at 1 micron pressure, $n_D^{25}$ 1.6048. The dimethiodide crystallizes from a mixture of absolute alcohol, acetone and petroleum ether as white needles that melt with gas evolution at 123–4.5° C.

*Example LXIII.—Di-(m-dimethylaminophenyl) ester of p-dimethylaminophenylaminothiophosphonic acid, (heated at 120° C. for 7 hours, no solvent).*—The base crystallizes from 95% alcohol as white needles, M. P. 124–6° C. The trimethiodide crystallizes from a mixture of absolute alcohol and isopropanol with 4 molecules of water as white crystals that melt with gas evolution at 147–50° C.

*Example LXIV.—Di-(m-dimethylaminophenyl) ester of benzylaminothiophosphonic acid, (heated at 100° C. for 1 hour, no solvent).*—The base is an amber oil that distills at about 185° C. at 1 micron pressure, $n_D^{25}$ 1.6212. The dihydrochloride crystallizes from a mixture of absolute alcohol and isopropanol as a white solid melting with gas evolution at 179–181° C. The dimethiodide crystallizes from a mixture of 95% alcohol and isopropanol with 2 molecules of water as white crystals that melt with gas evolution at 172–3.5° C.

*Example LXV.—Di-(m-dimethylaminophenyl) ester of α-methylbenzylaminothiophosphonic acid, (heated at 100° C. for 2 hours, no solvent).*—The base is a very viscous yellow oil that distills at about 200° C. at 1 micron pressure, $n_D^{25}$ 1.6165. The dimethiodide crystallizes from a mixture of absolute alcohol and isopropanol with 3 molecules of water as a pale tan solid that melts with gas evolution at 117–20° C.

*Example LXVI.—Di-(m-dimethylaminophenyl) ester of N-methylbenzylaminothiophosphonic acid, (heated at 100° C. for 7 hours, no solvent).*—The base is a pale yellow oil that distills at about 175° C. at 1 micron pressure, $n_D^{25}$ 1.6140. The dimethiodide crystallizes from absolute alcohol with 2 molecules of water as white plates that melt with gas evolution at 147–9° C.

*Example LXVII.—Di-(m-dimethylaminophenyl) ester of N-n-butylbenzylaminothiophosphonic acid, (heated at 130° C. for 5 hours, no solvent).*—The base is a yellow oil that distills at 175° C. at 1–2 microns pressure, $n_D^{25}$ 1.5986. The dimethiodide crystallizes from a mixture of absolute alcohol, acetone and petroleum ether as a white solid that melts at 168–71° C.

*Example LXVIII.—Di-(m-dimethylaminophenyl) ester of N-3-dimethylaminopropyl-p-dimethylaminobenzylaminothiophosphonic acid, (heated at 130° C. for 3 hours and at 160° C. for 1 hour, no solvent).*—The N-3-dimethylaminopropyl-p-dimethylaminobenzylamine is prepared by condensing 3-dimethylaminopropylamine with p-dimethylaminobenzaldehyde in 95% alcohol and hydrogenating the resulting Schiff's base at room temperature and 1–3 atmospheres hydrogen pressure using a platinum oxide catalyst. (It is a colorless liquid, B. P. 138–40° C./0.5 mm., $n_D^{25}$ 1.5347.) The base is a yellow oil that distills at about 180° C. at 1–2 microns pressure, $n_D^{25}$ 1.6030.

*Example LXIX.—Di-(m-dimethylaminophenyl) ester of dibenzylaminothiophosphonic acid, (heated at 120° C.*

*for 14 hours and at 150° C. for 7 hours, no solvent).*—The base is an amber oil that distills at about 200° C. at 2–3 microns pressure, $n_D^{25}$ 1.6230. The dimethiodide crystallizes from absolute alcohol as feathery white needles that melt with gas evolution at 126–8° C.

*Example LXX.—Di - (m-dimethylaminophenyl) ester of cyclohexylaminothiophosphonic acid, (heated at 125° C. for ½ hour, no solvent).*—The base crystallizes from isopropanol as a white solid, M. P. 59.5–61°C. The dimethiodide crystallizes from isopropanol with 2 molecules of water as a yellow solid that melts with gas evolution at 112–8° C.

*Example LXXI.—Di - (m-dimethylaminophenyl) ester of morpholinothiophosphonic acid, (heated at 100° C. for ½ hour, no solvent).*—The base crystallizes from a mixture of ethyl acetate and petroleum ether as long white needles, M. P. 78.5–9.5° C. The dimethiodide crystallizes from 85% isopropanol with 4 molecules of water as white crystals that melt with gas evolution at 170–2° C.

*Example LXXII.—Di - (m-dimethylaminophenyl) ester of 2-pyridylaminothiophosphonic acid, (heated at 100° C. for 14 hours, no solvent).*—The base crystallizes from ethyl acetate as a white solid, M. P. 130–1° C. The dihydrochloride crystallizes from a mixture of isopropanol and ether as a white solid that softens about 70° C. and melts indefinitely about 90° C. The dimethiodide crystallizes from a mixture of methanol and isopropanol with 2 molecules of water as a pale yellow solid that melts with gas evolution at 158–61° C.

*Example LXXIII.—Di - (m-dimethylaminophenyl) ester of hydrazinothiophosphonic acid, (heated at 70–75° C. for 7 hours, in benzene).*—The base crystallizes from 95% alcohol as white crystals, M. P. 117–8° C. The dimethiodide crystallizes from a mixture of methanol and petroleum ether with 2 molecules of water as white needles that melt with gas evolution at 156–8° C.

*Example LXXIV.—Di - (m-dimethylaminophenyl) ester of phenylhydrazinothiophosphonic acid, (heated at 75–8° C. for 5 hours, in benzene).*—The base crystallizes from 95% alcohol as fluffy white needles, M. P. 146–7.5° C. The dimethiodide crystallizes from a mixture of methanol and isopropanol with 1 molecule of water as pale tan crystals that melt with gas evolution at 183–4° C.

EXAMPLE LXXV

*Di-(m-dimethylaminophenyl) β-dimethylaminoethyl thiophosphate*

To a solution of 8.91 g. β-dimethylaminoethanol (0.10 mole) and 1.15 g. sodium (0.05 mole) in 100 cc. dry benzene is added a benzene solution of 0.05 mole of di-(m-dimethylaminophenyl) thiophosphoryl chloride, prepared as described in Example LIII, with stirring at 2–5° C. during 3 hours. The mixture is stirred at 2–5° C. for 3 hours longer, then left at room temperature for 6 days, washed with four 50 cc. portions of water and with 25 cc. saturated sodium chloride solution and is dried over calcium sulfate. Distillation of solvent under reduced pressure to 100° C./12 mm. leaves 16.4 g. yellow oil (77% theory). When purified through its oxalate salt, the base is obtained as a colorless oil, $n_D^{25}$ 1.5851. The monooxalate crystallizes from isopropanol as a white solid, M. P. 136–7° C.

EXAMPLE LXXVI

*m-Dimethylaminophenyl ester of di-(n-butylamino) thiophosphinic acid*

A solution of 13.71 g. m-dimethylaminophenol (0.10 mole) and 10.11 g. triethylamine (0.10 mole) in 150 cc. dry benzene is added with stirring to a solution of 16.95 g. phosphorous thiochloride (0.10 mole) in 100 cc. dry benzene during 3 hours at 2–4° C. The mixture is kept at 2–4° C. overnight and at room temperature for 3 hours. 29.35 grams n-butylamine (0.40 mole) in 50 cc. benzene is added with stirring at 2–4° C. during 4 hours. The mixture is left at room temperature for 3 days, then stirred at 70–75° C. for 2 hours, cooled and filtered. Solvent is distilled from the filtrate under reduced pressure, and the residue is taken up in 300 cc. ether and filtered. The filtrate is washed with water, N acetic acid, 2N sodium hydroxide, again with water and with saturated brine, stirred with a little Darco, dried over calcium sulfate, and filtered. Distillation of solvent from the filtrate leaves 29.02 g. (85% theory) dark oil that solidifies on cooling. Purification by crystallization from 95% alcohol gives white needles, M. P. 59.5–61° C.

EXAMPLE LXXVII

*Di-(m-dimethylaminophenyl) thiophosphate*

18.27 grams of di-(m-dimethylaminophenyl) thiophosphoryl chloride (0.05 mole), prepared as described in Example LIII, is stirred with 10 cc. 10N sodium hydroxide (0.10 mole) for 3 hours at room temperature and for 15 minutes at 90° C. and cooled. After adding 4.17 cc. 12N hydrochloric acid (0.05 mole), the mixture is extracted with 450 cc. chloroform. The chloroform extract is dried over calcium sulfate, and solvent is removed by distillation. The residue is crystallized from chloroform, from dilute alcohol and from methanol, giving white crystals, M. P. 170–2° C. The crystals turn blue near their melting point or on standing in air.

EXAMPLE LXXVIII

*Tetra-(m-dimethylaminophenyl) ester of hydrazinobisthiophosphinic acid*

A mixture of 14.77 g. di-(m-dimethylaminophenyl) thiophosphoryl chloride (0.04 mole), prepared as described in Example LXII, 14.66 g. di(m-dimethylaminophenyl) ester of hydrazinothiophosphonic acid (0.04 mole) and 3.16 g. pyridine (0.04 mole) is heated to 150° C. during 1 hour and held at about 150° C. for 2 hours, then cooled. The product is taken up in 50 cc. water plus 300 cc. ether. After adding 25 cc. 2N sodium hydroxide and shaking, the ether layer is separated and washed with 2N sodium hydroxide, with water and with saturated brine, stirred with a little Darco, dried over calcium sulfate and filtered. Removal of solvent by distillation leaves 25.65 g. (91% theory) of viscous dark red oil. The tetramethiodide crystallizes from a mixture of propylene glycol and absolute alcohol with 6 molecules of water as white crystals that melt with gas evolution at 144–6° C.

EXAMPLE LXXIX

*Di-(m-dimethylaminophenyl) p-nitrophenyl phosphate*

A solution of 13.71 g. of m-dimethylaminophenol (0.10 mole) and 10.11 g. triethylamine (0.10 mole) in 125 cc. benzene is added to a solution of 7.67 g. phosphorus oxychloride (0.05 mole) in 75 cc. benzene with stirring at 1–2° C. during 2¼ hours. The mixture is stirred in an ice bath for 5 hours, then left at room temperature overnight and filtered. The filtrate is added to a solution of 6.96 g. p-nitrophenol (0.05 mole) and 5.06 g. trimethylamine (0.05 mole) in 200 cc. benzene, and the mixture is stirred at about 78° C. for 6 hours. Most of the benzene is distilled off, 5.06 g. more triethylamine is added, and again stirred at about 78° C. for 4 hours and cooled. The product is stirred with 300 cc. ether and filtered from triethylamine hydrochloride. The filtrate is washed with water, 2N sodium hydroxide, again with water and with saturated brine, stirred with a little Darco, dried over calcium sulfate (after adding 100 cc. benzene to prevent precipitation of the product), and filtered. Distillation of solvent from the filtrate leaves 17.6 g. viscous orange oil (77% theory) that solidifies on standing. When purified by crystallization from 95% alcohol, orange crystals are obtained, M. P. 121–2° C. The monomethobromide crystallizes from a mixture of methanol and isopropanol as pale yellow crystals, M. P. 153.5–4° C.

EXAMPLE LXXX

*Di-(m-dimethylaminophenyl) p-nitrophenyl thiophosphate*

A solution of 6.96 g. p-nitrophenol (0.05 mole) and 5.06 g. triethylamine (0.05 mole) in 10 cc. benzene is slowly added to a solution of 8.47 g. phosphorus thiochloride (0.05 mole) in 75 cc. benzene with stirring at 2–4° C. The mixture is stirred cold for 1 hour and at room temperature for 4 hours and is left at room temperature overnight and filtered. The filtrate is added to a solution of 0.10 mole sodium m-dimethylaminophenate in isopropanol and benzene (prepared as described in Example XXV) with stirring at 2–3° C. during 1½ hours. The mixture is stirred at 2–4° C. for 2 hours and left at room temperature for 3 days, then washed with water, 2N sodium hydroxide, again with water and with saturated brine, stirred with a little Darco, dried over calcium sulfate, and filtered. Distillation of solvent from the filtrate leaves 20.8 g. (88% theory) of dark orange oil that solidifies on standing. When purified by crystallization from methanol, from isopropanol and from a mixture of ether and methanol, orange crystals are obtained, M. P. 74.5–5.5° C.

This application is a continuation-in-part of my application Serial No. 75,090 filed February 7, 1949.

I claim:

1. An aryl ester of an acid phosphorus compound wherein the aryl ring is substituted by a group including an aliphatically disubstituted amino group.

2. An aryl ester of an acid phosphorus compound wherein the aryl ring is substituted by a group including a member of the group consisting of dialkylamino, piperidino, pyrrolidino and morpholino groups, and the acid addition and quaternary salts thereof.

3. An aryl ester of an acid phosphorus compound wherein the aryl ring is substituted by a group including a dialkylamino group.

4. A compound of the general formula

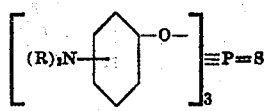

wherein R is a lower alkyl group.

5. A compound of the general formula

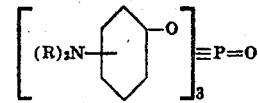

wherein R is a lower alkyl group.

6. A compound of the general formula

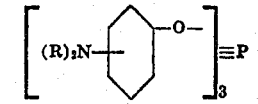

wherein R is a lower alkyl group.

7. Tri-(m-dimethylaminophenyl)thiophosphate.
8. Tri-(p-dimethylaminophenyl)thiophosphate.
9. Tri-(m-dimethylaminophenyl)phosphate.
10. Tri-(m-diethylaminophenyl)phosphate.
11. Tri-(m-dimethylaminophenyl)phosphite.
12. A method of making aryl esters of acid phosphorus compounds wherein the aryl ring is substituted by a group including an aliphatically disubstituted amino group which comprises contacting a phosphorus halide compound having from 1 to 3 halogen atoms directly attached to phosphorus with an aryl compound having a hydroxyl group attached to the ring and a group including an aliphatically disubstituted amino group attached to the ring.

13. A method of making aryl esters of acid phosphorus compounds wherein the aryl ring is substituted by a group including an aliphatically disubstituted amino group which comprises contacting a phosphorus halide compound having from 1 to 3 halogen atoms directly attached to phosphorus with an aryl compound having a hydroxyl group attached to the ring and a group including an aliphatically disubstituted amino group attached to the ring in the presence of an acid acceptor.

14. A method as defined in claim 12 wherein the aryl compound is reacted in the form of an alkali metal salt thereof.

15. A method of making aryl esters of thiophosphoric acid wherein the aryl ring is substituted by a group including an aliphatically disubstituted amino group which comprises contacting a phosphorus thiohalide with an aryl compound having a hydroxyl group attached to the ring and a group including an aliphatically disubstituted amino group attached to the ring.

16. A method as defined in claim 15 wherein the aryl compound is reacted in the form of an alkali metal salt thereof.

17. A method of making aryl esters of phosphoric acid wherein the aryl ring is substituted by a group including an aliphatically disubstituted amino group which comprises contacting a phosphorus oxyhalide with an aryl compound having a hydroxyl group attached to the ring and a group including an aliphatically disubstituted amino group attached to the ring.

18. A method of making aryl esters of phosphorous acid wherein the aryl ring is substituted by a group including an aliphatically disubstituted amino group which comprises contacting a phosphorous halide with an aryl compound having a hydroxyl group attached to the ring and a group including an aliphatically disubstituted amino group attached to the ring.

References Cited in the file of this patent

UNITED STATES PATENTS

| 1,982,903 | Clemmensen | Dec. 4, 1934 |
| 2,078,421 | Shuman | Apr. 27, 1937 |
| 2,552,536 | Drake | May 15, 1951 |

FOREIGN PATENTS

| 655,875 | Great Britain | Aug. 8, 1951 |

OTHER REFERENCES

Bergel: J. Pharm. and Pharmacol., 111, pp. 385–399 (1951).